US009216865B2

(12) United States Patent
De Freitas et al.

(10) Patent No.: US 9,216,865 B2
(45) Date of Patent: Dec. 22, 2015

(54) EQUIPMENT FOR UNLOADING BULK FREIGHTER AND BULK CARRIER

(71) Applicant: VALE S.A., Rio de Janeiro (BR)

(72) Inventors: Tertuliano Francisco De Freitas, Vitória (BR); Warlley Soares Santos, Vitória (BR)

(73) Assignee: VALE S.A., Rio de Janeiro (BR)

( * ) Notice: Subject to any disclaimer, the term of this patent is extended or adjusted under 35 U.S.C. 154(b) by 76 days.

(21) Appl. No.: 13/962,734

(22) Filed: Aug. 8, 2013

(65) Prior Publication Data

US 2014/0086708 A1     Mar. 27, 2014

Related U.S. Application Data

(60) Provisional application No. 61/704,365, filed on Sep. 21, 2012.

(51) Int. Cl.
| *B63B 27/22* | (2006.01) |
| *B65G 67/60* | (2006.01) |
| *B63B 25/04* | (2006.01) |
| *B66C 3/00* | (2006.01) |
| *B66C 19/00* | (2006.01) |
| *B63B 27/12* | (2006.01) |
| *B63B 25/18* | (2006.01) |

(52) U.S. Cl.
CPC .............. *B65G 67/606* (2013.01); *B63B 25/04* (2013.01); *B63B 27/12* (2013.01); *B63B 27/22* (2013.01); *B66C 3/00* (2013.01); *B66C 19/00* (2013.01); *B63B 25/18* (2013.01)

(58) Field of Classification Search
CPC ........ B63B 25/04; B65G 67/606; B66C 3/00; B66C 19/00
USPC ........... 114/27, 31, 32, 73, 78; 298/19 V, 8 R; 414/137.1, 138.1, 138.2, 138.4, 138.8, 414/140.6, 140.9, 143.1, 143.2, 386, 419, 414/421, 423, 424, 425, 581, 648, 651, 756, 414/768, 770, 773, 782
See application file for complete search history.

(56) References Cited

U.S. PATENT DOCUMENTS

| 227,019 | A | * | 4/1880 | Knuth ............................ 114/32 |
| 273,178 | A | * | 2/1883 | Souther .......................... 114/33 |
| 289,498 | A | * | 12/1883 | Brainard ........................ 114/32 |
| 425,607 | A | * | 4/1890 | Green ........................... 105/273 |
| 502,142 | A | * | 7/1893 | Ryan ............................... 114/32 |
| 590,594 | A | * | 9/1897 | Scripture ...................... 414/680 |
| 656,509 | A | * | 8/1900 | Bullis ............................. 114/32 |

(Continued)

*Primary Examiner* — Gregory Adams
(74) *Attorney, Agent, or Firm* — Arent Fox LLP

(57) ABSTRACT

An equipment for unloading a bulk carrier comprises a plurality of structures fastened to a fixed platform, the plurality of structures is fastened to the fixed platform mutually parallel, each structure comprising a mobile element having fastening elements which are associated to a projection of at least a removable hold of a bulk carrier, the mobile element being displaced from a first position (A) to a second position (B) so as to tilt at least a removable hold onto an apron feeder and then to a system of conveyor belts. Also, a bulk carrier comprises at least a removable hold including a compartment for transporting bulk products having a plurality of projections disposed in a longitudinal line and mutually parallel at a first end of the removable hold and an articulation mechanism disposed along a second end of the removable hold parallel to and opposite the first end.

11 Claims, 10 Drawing Sheets

(56) References Cited

U.S. PATENT DOCUMENTS

Figure 1:
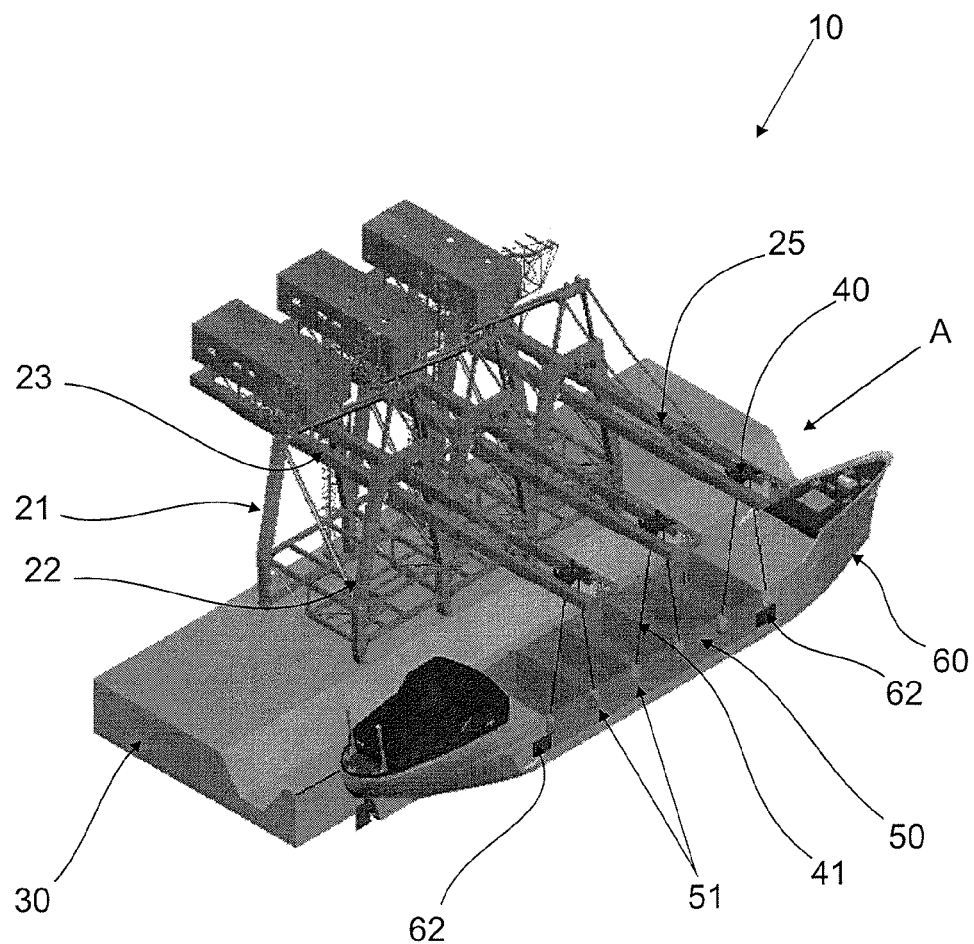

| | | | | |
|---|---|---|---|---|
| 664,288 | A * | 12/1900 | Pratt | 414/142.8 |
| 820,974 | A * | 5/1906 | Hilpert | 114/26 |
| 1,021,543 | A * | 3/1912 | McKelvey | 414/386 |
| 1,235,386 | A * | 7/1917 | Scardino | 212/80 |
| 1,255,313 | A * | 2/1918 | Hurst et al. | 212/260 |
| 1,275,145 | A * | 8/1918 | Fitch | 414/342 |
| 1,371,812 | A * | 3/1921 | Robb et al. | 414/386 |
| 2,144,637 | A * | 1/1939 | Pugh et al. | 105/261.2 |
| 2,936,913 | A * | 5/1960 | Watt et al. | 414/393 |
| 2,938,487 | A * | 5/1960 | Franke | 114/32 |
| 3,403,796 | A * | 10/1968 | Willett | 414/386 |
| 3,887,091 | A * | 6/1975 | Buck | 414/344 |
| 4,573,850 | A * | 3/1986 | Suarez | 414/382 |
| 4,659,275 | A * | 4/1987 | Goodwin | 414/137.9 |
| 4,671,725 | A * | 6/1987 | Evans et al. | 414/137.1 |
| 7,341,012 | B2 * | 3/2008 | Loke | 114/27 |
| 7,517,183 | B2 * | 4/2009 | Waisanen | 414/386 |

* cited by examiner

EQUIPMENT FOR UNLOADING BULK FREIGHTER AND BULK CARRIER

CROSS-REFERENCE TO RELATED APPLICATION

This application is based upon and claims the benefit of priority of the U.S. Patent Application No. 61/704,365, filed Sep. 21, 2012, the disclosure of the prior application is hereby incorporated in its entirety by reference.

The present invention refers to equipment for unloading ships, particularly bulk carriers, which enables fast unloading of bulk products and with decreased emission of particles into the atmosphere, and further refers to a bulk carrier endowed with a removable hold to enable unloading of bulk material using the equipment for unloading ships.

BACKGROUND OF THE INVENTION

Bulk carriers transport products in bulk which may be in liquid or solid state.

Considering the bulk carriers which transport solid products such as ore, for example, it is noted that the unloading thereof is quite time-consuming and arduous, besides resulting in the emission of a high quantity of particulates, adversely affecting air quality.

In this sense, the state of the art comprises the process of unloading bulk carriers of solid cargo by way of a cradle disposed at the unloading terminal or port, this cradle being endowed with an overhead crane or mobile tower containing a sucker. The ship docks at the unloading terminal such that the mobile tower and the sucker are positioned over the ship's hold, where the bulk load is deposited.

The mobile tower moves linearly off the ship and along the longitudinal length thereof. During this displacement, the sucker withdraws the solid material from the ship's hold, transports it off the ship and deposits it onto conveyor belt.

The displacement of the mobile tower must be slow and stable, so that the sucker withdraws material steadily along the ship's hold, whereby preventing the vessel's structure from buckling. Accordingly, the unloading operation of carriers is time-consuming, expensive and harmful to the environment, because during suction there occurs the dispersion of particles which remain in suspension in the air.

Another process for unloading bulk carriers loaded with solid cargo by means of equipment found at the unloading terminal and/or port that is known in the state of the art consists of using a gantry or a mobile tower that comprises a dumpster or a "grab". The boat docks in the unloading terminal in a manner that the mobile tower and the dumpster are positioned above the cargo container of the ship, where the bulk cargo is held.

The mobile tower moves in a linear fashion alongside the boat. During this shift, the dumpster removes the solid bulk from the cargo hold, transports it off the carrier and deposits it on a conveyor belt system.

The displacement of the mobile tower should be stable, so that the dumpster may collect from the cargo hold in a constant fashion. This makes the unloading process for bulk carriers expensive and time consuming.

OBJECTIVES OF THE INVENTION

The objective of the present invention is to provide an equipment for unloading a bulk carrier that is capable of tilting the ship's hold whereby to unload the bulk product quickly, in a single run, minimizing the emission of particles.

It is also an objective of this invention to provide a bulk carrier comprising a removable hold that is capable of being tilted by the equipment for unloading a bulk carrier.

BRIEF DESCRIPTION OF THE INVENTION

The object of the invention is an equipment for unloading a bulk carrier, comprising a plurality of structures fastened to a fixed platform, the plurality of structures is fastened to the fixed platform mutually parallel, each structure comprising a mobile element endowed with fastening elements which are associated to a projection of at least a removable hold of a bulk carrier, the mobile element being displaced from a first position to a second position so as to tilt the removable hold over a large apron feeder thereafter the material is transferred onto a conveyor belt system.

Another object of this invention is a bulk carrier comprising at least a removable hold which consists of a compartment for transporting bulk product, endowed with a plurality of projections disposed in a longitudinal line and mutually parallel at a first end of the removable hold and an articulation mechanism disposed along a second end of the removable hold parallel to and opposite from the first end.

SUMMARY DESCRIPTION OF THE DRAWINGS

Figure 2:
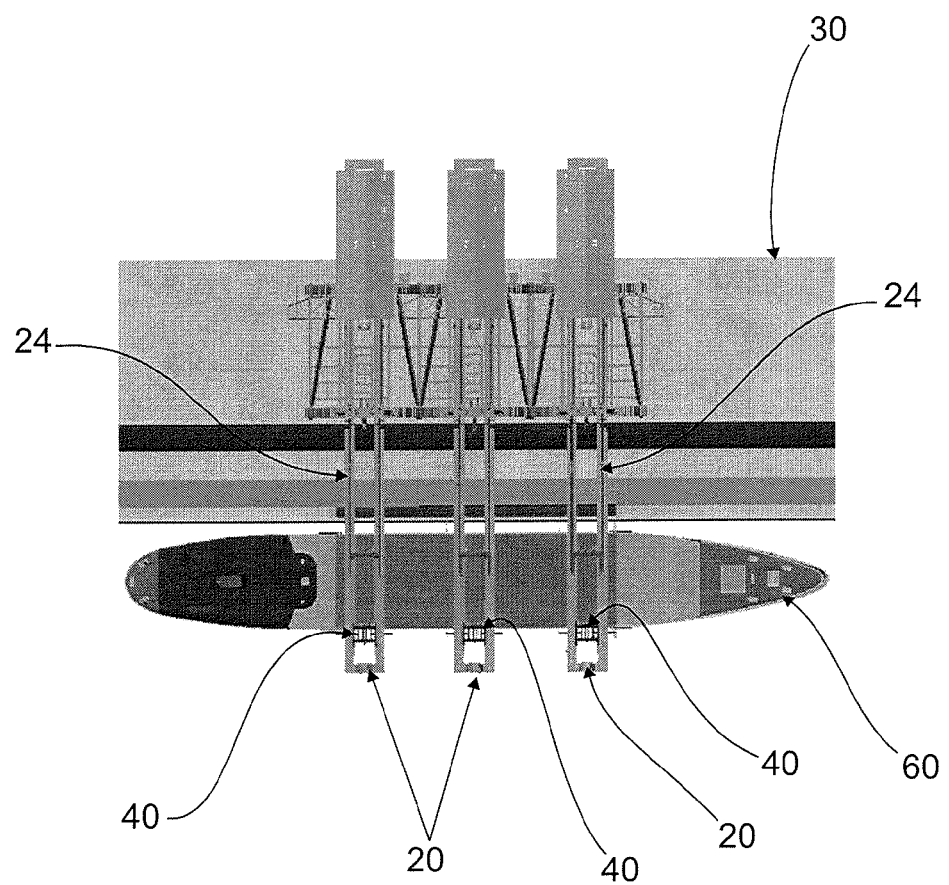
Figure 3:
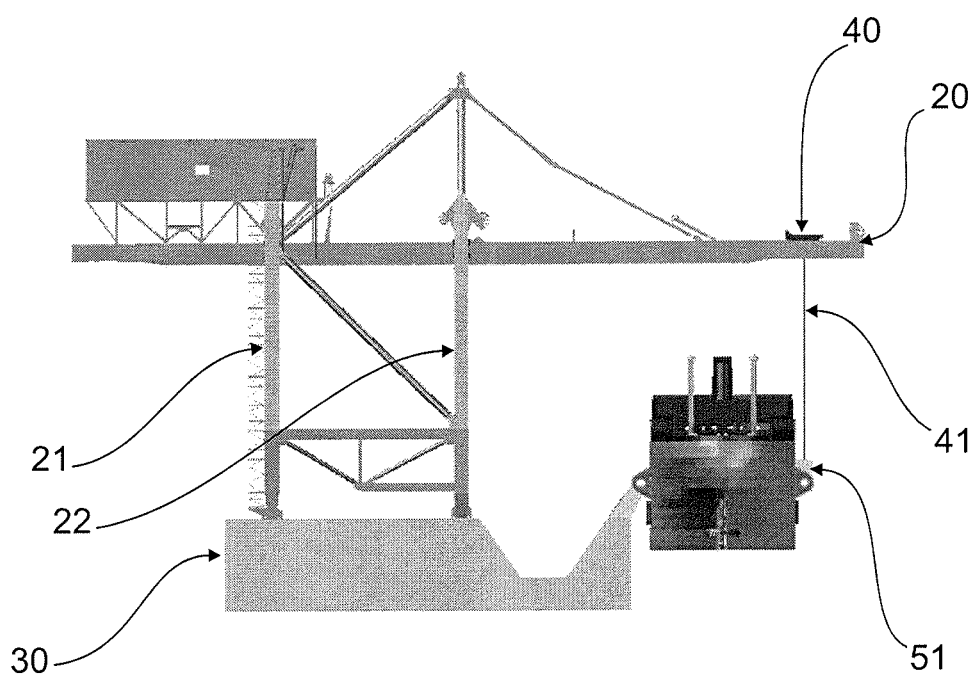
Figure 4:
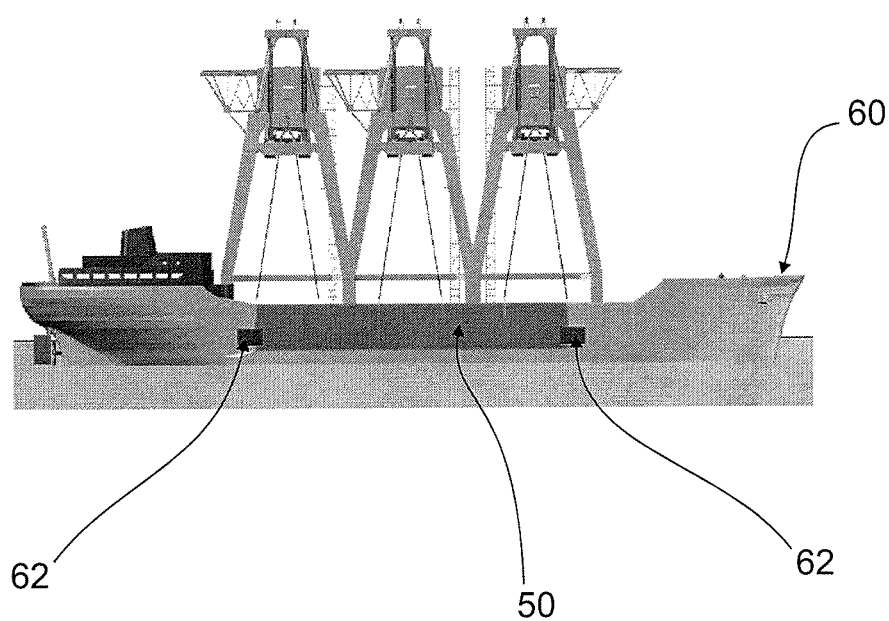
Figure 5:
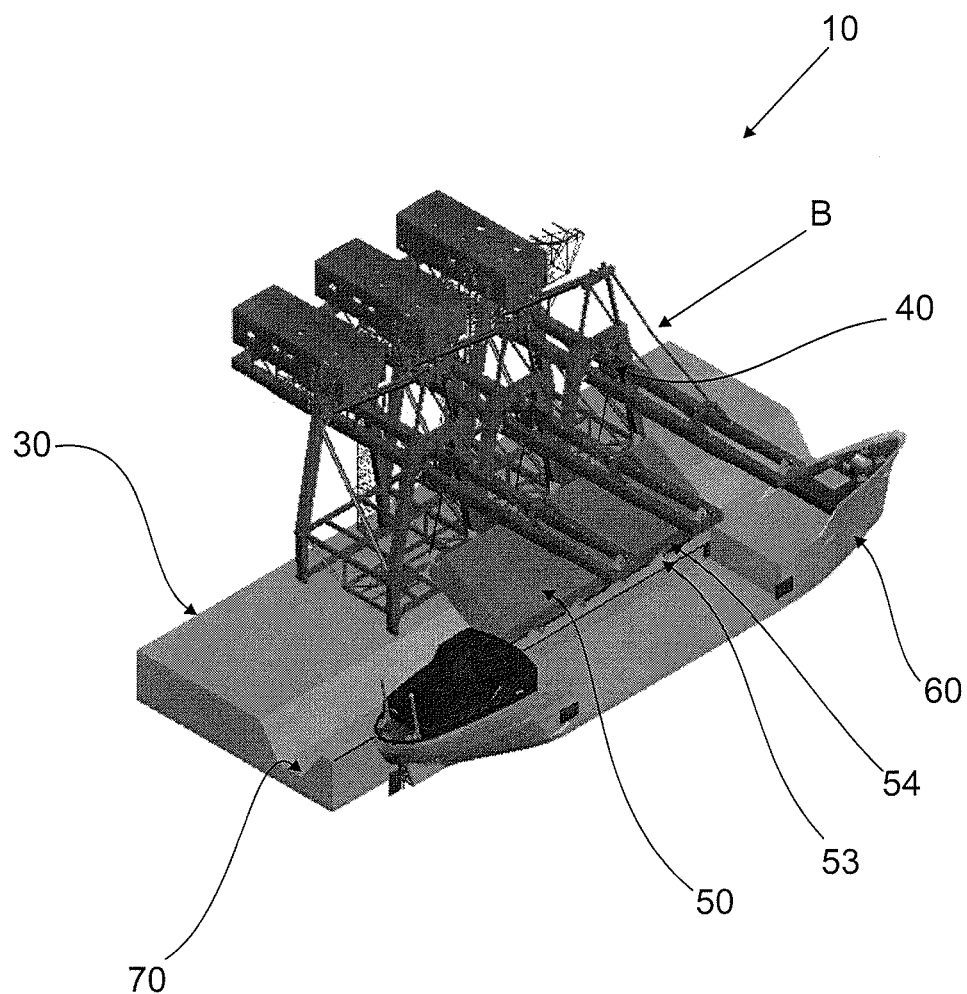
Figure 6:
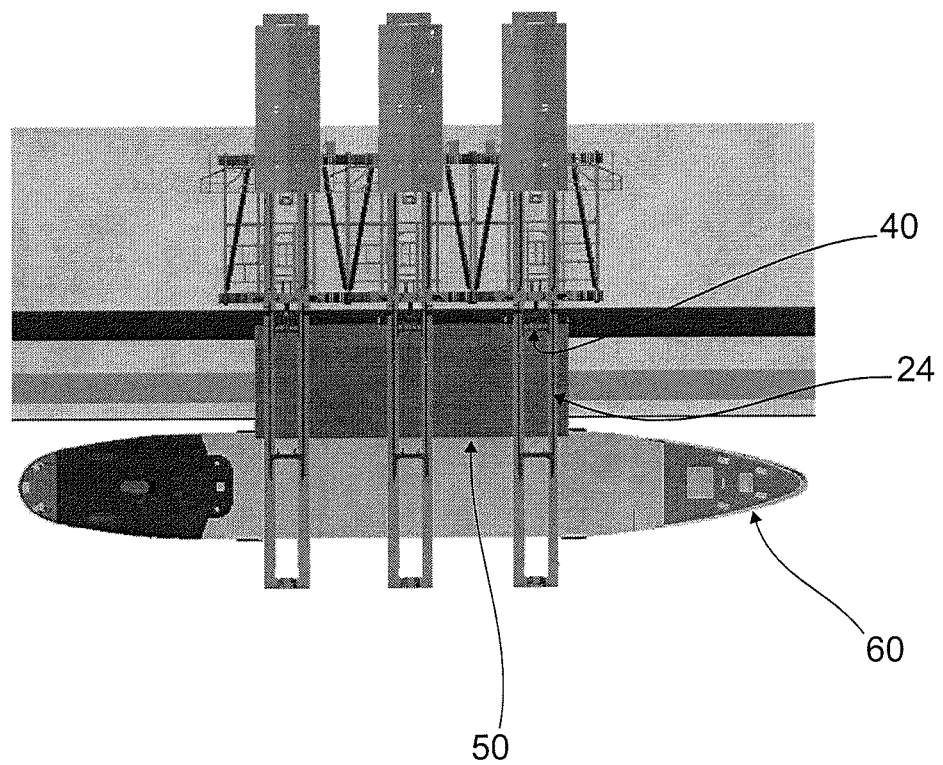
Figure 7:
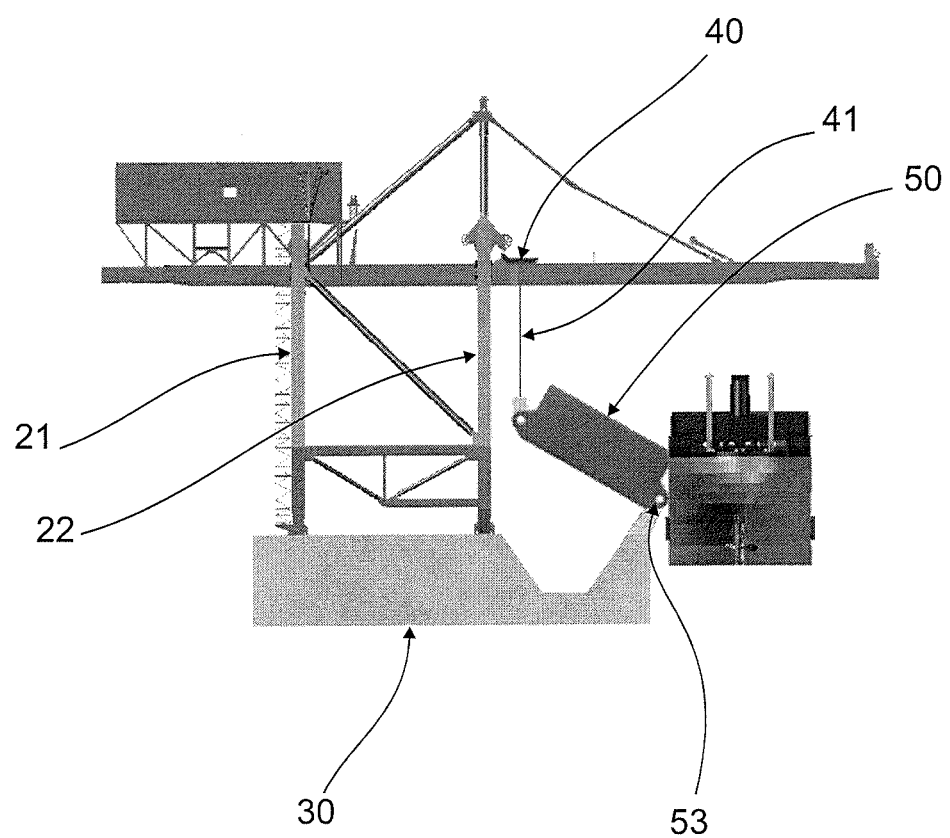
Figure 8:
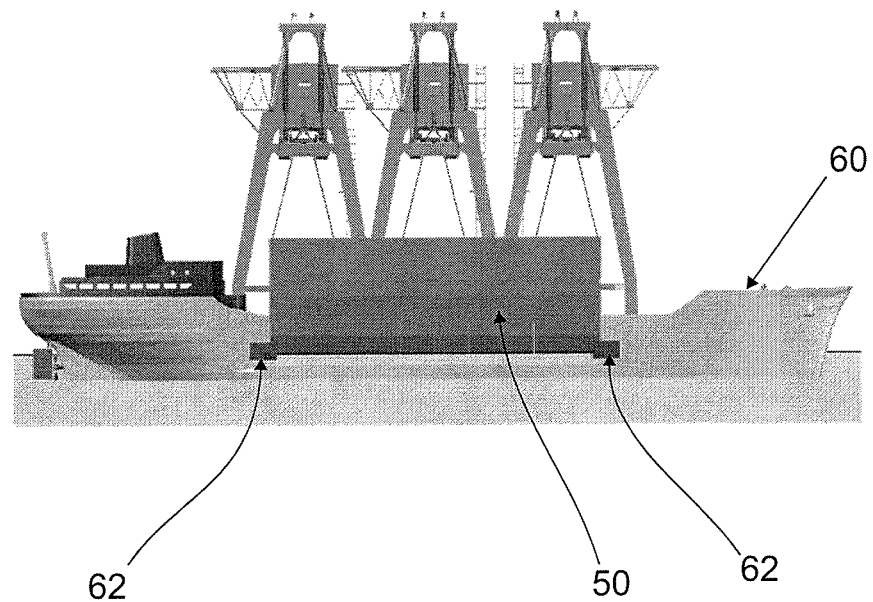
Figure 9:
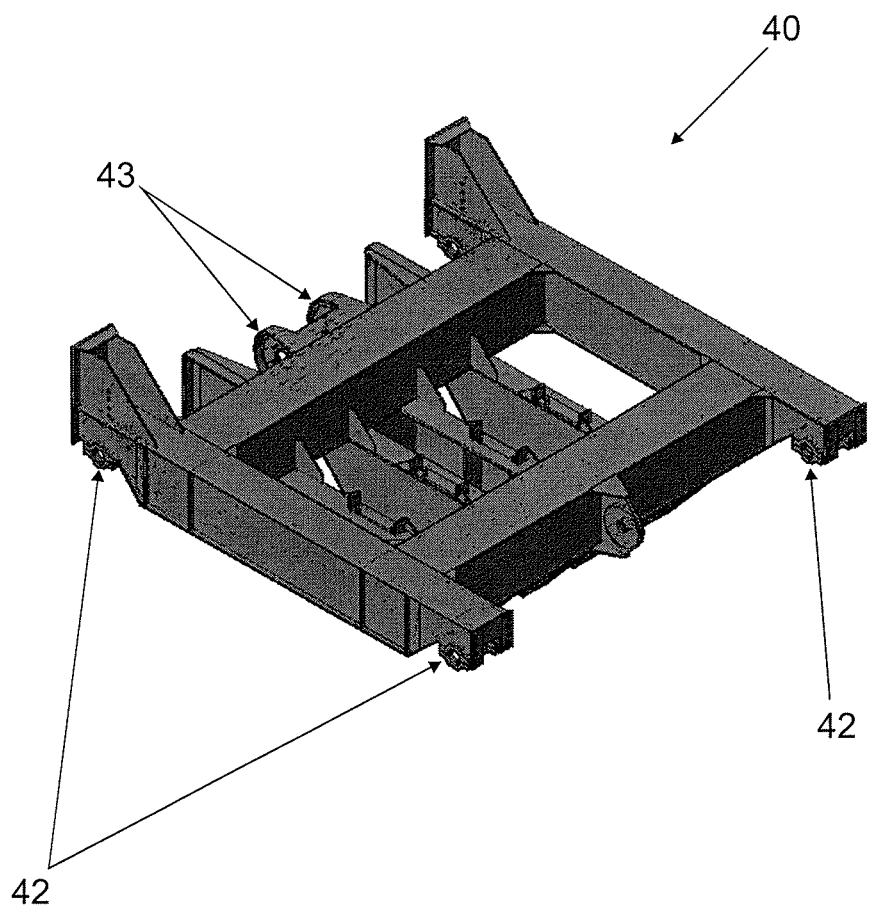
Figure 10:
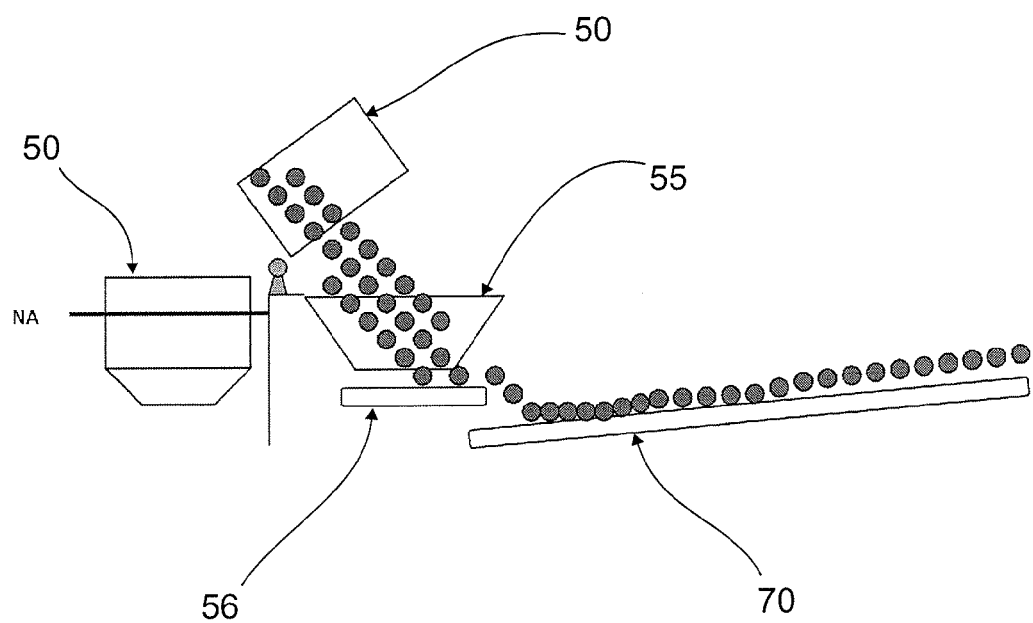

The present invention shall now be described in greater detail based on an example of execution represented in the drawings. The drawings show:

FIG. 1—is a schematic perspective view of the equipment for unloading a bulk carrier coupled to the removable hold of a bulk carrier;

FIG. 2—is a schematic view of the of bulk cargo removal system attached to the bulk carrier cargo hold seen from above;

FIG. 3—is a schematic view of the of bulk cargo removal system attached to the bulk carrier cargo hold seen from the front;

FIG. 4—is a schematic view of the of bulk cargo removal system attached to the bulk carrier cargo hold seen from the side;

FIG. 5—is a schematic perspective view of the removable hold of a bulk carrier being tilted by the equipment for unloading a bulk carrier, for unloading bulk product;

FIG. 6—is a schematic view of the top of the removable hold of a bulk carrier being tilted by the equipment for unloading a bulk carrier, for unloading bulk product;

FIG. 7—is a schematic view of the front of the removable hold of a bulk carrier being tilted by the equipment for unloading a bulk carrier, for unloading bulk product;

FIG. 8—is a schematic view of the side of the removable hold of a bulk carrier being tilted by the equipment for unloading a bulk carrier, for unloading bulk product;

FIG. 9—is a schematic view of the mobile element for hoisting and tilting of the removable holds for unloading a bulk carrier;

FIG. 10—is a schematic flowchart of the unloading of a bulk carrier with removable holds;

DETAILED DESCRIPTION OF THE DRAWINGS

According to a preferred embodiment and as can be seen from FIG. 1 onwards, the equipment for unloading a bulk carrier 10, the object of this invention, is particularly used on a fixed platform 30, preferably an unloading terminal, a port or a ship docking pier.

This equipment for unloading a bulk carrier 10 comprises a plurality of structures 20 fastened to the fixed platform 30. These structures 20 are preferably hoisting structures and are fastened to the fixed platform 30 mutually parallel, at regular and previously calculated intervals.

Each structure 20 is formed by at least two main lift beams 21, 22 fastened vertically to the fixed platform 30 and support beams 23 fastened horizontally over the lift beams 21, 22. The support beam 23 comprises at least one pair of longitudinal rails 24 in its upper portion 25, on these rails 24 a mobile element 40 (trolley) moves linearly.

This movement can be achieved with wheels 42 attached to the mobile element 40, rollers or other equivalent means. Furthermore, the mobile element 40 is endowed with a pulley system that aids its movement with a steel cable system.

The mobile element 40 comprises a structure where there are associated fastening elements 41, this structure may be formed by pulleys, ratchets or other equivalent elements and the fastening elements 41 consist of at least one pair of chains sized so as to support the weight of the compartment to be tilted. In this case the chains comprise a system which end is fastened to a drome (not shown) fixed to the equipment or to the fixed platform 30, pass through the mobile element 40 and a second end is fastened to a projection or simple eyebolt 51 of at least a removable hold 50 of the bulk carrier 60.

The fastening elements 41 of each mobile element 40 are associated to the projection 51 disposed on the removable hold 50 of the bulk carrier 60 when the mobile element 40 is positioned at a first position A. As can be seen in FIGS. 1 to 4, the removable hold 50 comprises a plurality of projections or eyebolt 51 disposed in a longitudinal line and mutually parallel at a first end 52 of the length of the removable hold 50, each associated to a fastening element 41 of a mobile element 40.

For oceanic shuttling the removable holds of the bulk carrier 60 are fastened by means of claws, clamps, mounting arms or mechanical fixtures 62 said fixtures activated by a hydraulic system. During the unloading of the bulk carrier 60, the fixtures unlock, releasing the removable holds for tilting.

As illustrated in FIGS. 5, 6, 7 and 8, the mobile elements 40 of each structure 20 move, simultaneously, from the first position A to a second position B. As of this displacement, the fastening elements 41 drive the projections 51 so as to tilt the removable hold 50.

The removable hold 50 of the bulk carrier 60 consists of a compartment for transporting bulk products, thus, so that the tilting movement occurs beyond the drive of the fastening elements 41. This removable hold 50 comprises an articulation mechanism 53 disposed along its second end 54 parallel to and opposite from the first end 52. Optionally, the bulk carrier 60 may be provided by a plurality of removable holds 50 that can be tilted by the equipment for unloading the bulk carrier 10 object of this invention.

As can be seen form FIG. 10, after the tilting movement, the bulk material which is deposited in the removable hold 50 descends by gravity into a hopper 55 which in turn unloads this material into an apron feeder 56 and then to a system of conveyor belts 70.

With the equipment for unloading the bulk carrier 10 and with the bulk carrier 60 endowed with a removable hold 50, objects of this invention, the unloading of the bulk material is performed in an optimized manner, resulting in a significant gain in time in unloading this type of vessel, as the entire content of the hold 50 is withdrawn by the action of gravity and in a single run.

Another advantage is the considerable decrease in the emission of particles into the air, decreasing the damage caused to the operators and support team.

Having described one example of a preferred embodiment, it shall be understood that the scope of the present invention encompasses other possible variations, being limited only by the content of the accompanying claims, possible equivalents being included therein.

The invention claimed is:

1. An equipment for unloading a bulk carrier, comprising:
a plurality of structures fastened to a fixed platform, each structure comprising at least one lift beam extending vertically from the fixed platform and a support beam extending horizontally from the at least one lift beam; and
a plurality of mobile elements comprising fastening elements arranged to attach to a plurality of projections, respectively, of a removable hold of a bulk carrier,
wherein the plurality of mobile elements are arranged on respective support beams of the plurality of structures and are each configured to move laterally between a first position (A) and a second position (B) on the respective support beams to tilt the removable hold to unload a bulk product from the bulk carrier, and
wherein the removable hold of the bulk carrier comprises:
a compartment for transporting bulk products having a bottom surface connected to a first side wall and an opposite second side wall, with the plurality of projections disposed in a longitudinal line and mutually parallel on the first side wall, and
an articulation mechanism disposed above the bottom surface along an outside of the second side wall, the articulation mechanism configured to enable tilting movement of the removable hold.

2. The equipment according to claim 1, wherein each support beam comprises longitudinal rails in an upper portion on which the respective mobile element moves linearly.

3. The equipment according to claim 2, wherein the fastening elements of each mobile element comprise chains having a first end fastened to the fixed platform and a second end attachable to the plurality of projections of the removable hold.

4. The equipment according to claim 1, wherein the articulation mechanism is arranged on the outside of the second side wall to allow the removable hold to tilt beyond a 90 degree angle relative to a starting position of the removable hold.

5. The equipment according to claim 4, wherein the removable hold is movable via the articulation mechanism between a first position and a second position, wherein the bottom surface is located below the articulation mechanism in the first position, and wherein an entirety of the bottom surface is located above the articulation mechanism in the second position.

6. The equipment according to claim 1, wherein the articulation mechanism is arranged on the outside of the second side wall to allow the removable hold to tilt by about 135 degrees relative to a starting position of the removable hold.

7. The equipment according to claim 1, wherein the second side wall has a first end attached to the bottom surface and a second end opposite the first end, and wherein the articulation mechanism is arranged on the outside of the second side wall adjacent to the second end of the second side wall.

8. The equipment according to claim 1, wherein lateral movement of the plurality of mobile elements on the respective support beams of the plurality of structures between the first position (A) and the second position (B) comprises lateral movement relative to the removable hold.

9. The equipment according to claim 1, further comprising:
a hopper, and
an apron feeder positioned below the hopper,
wherein the hopper is positioned to receive the bulk product from the removable hold upon movement of the plurality of mobile elements from the first position (A) to the second position (B) on the respective support beams of the plurality of structures.

10. An equipment for unloading a bulk carrier, comprising:
a plurality of structures fastened to a fixed platform, wherein the plurality of structures is fastened to the fixed platform mutually parallel,
each structure comprising a mobile element endowed with fastening elements which are associated to a projection of at least a removable hold of a bulk carrier, the mobile element being displaced from a first position (A) to a second position (B) so as to tilt at least a removable hold onto an apron feeder, and
wherein each structure of the plurality of structures comprises at least two lift beams fastened vertically to the fixed platform and support beams fastened horizontally at ends of the supporting beams, the support beam being endowed with longitudinal rails in its upper portion on which the mobile element moves linearly.

11. The equipment, according to claim 10, wherein the fastening elements of the mobile element include chains containing a first end fastened to the fixed platform and a second end fastened to the projection of the removable hold.

* * * * *